Feb. 2, 1960 N. L. COHEN ET AL 2,923,871
TWO-PHASE VARIABLE FREQUENCY POWER SUPPLY FOR MOTOR
Filed March 8, 1954 4 Sheets-Sheet 1

INVENTORS.
NATHANIEL L. COHEN
EDGAR W. VAN WINKLE
BY George Sipkin
Lee J. Huntzberger
ATTORNEYS INVENTORS.
NATHANIEL L. COHEN
BY EDGAR W. VAN WINKLE
George Sipkin
Lee J. Huntzberger
ATTORNEYS

United States Patent Office 2,923,871
Patented Feb. 2, 1960

2,923,871

TWO-PHASE VARIABLE FREQUENCY POWER SUPPLY FOR MOTOR

Nathaniel L. Cohen, New Milford, and Edgar W. Van Winkle, Rutherford, N.J., assignors to the United States of America as represented by the Secretary of the Navy Application March 8, 1954, Serial No. 414,920

2 Claims. (Cl. 318—171)

This invention relates to a two-phase variable frequency power supply and more particularly to a two-phase variable frequency power supply, characterized by a constant difference between phases over at least two decades of a logarithmic frequency range.

Need often arises for a two-phase power supply adapted to provide useful power output over a range of frequencies wherein the two phases are separated by a constant phase angle. A two-phase power supply of this type is particularly useful for powering two-phase motors. This invention includes two phase-shifting networks which produce separate outputs having the same waveshape as an input voltage simultaneously presented to both networks. The two networks as shown generate voltage outputs at phase angles with respect to the input voltage that increase substantially linearly over the useful frequency range.

An object of this invention is to provide a two-phase power supply.

A further object is to provide a two-phase power supply whose output voltages follow a single input voltage with substantially no frequency distortion.

A further object is to provide a two-phase power supply adapted to be controlled by one signal voltage and wherein the output voltages of the two phases are 90° apart over the operating frequency range.

A further object is to provide a two-phase power supply adapted to provide a two-phase power output whose output voltages are separated by a constant 90 degree phase difference throughout the operating frequency range.

A further object is to provide a plural phase power supply for a plural phase motor requiring only a single manual control to cause the motor to operate over a broad range of speed with substantially constant phase angle between the phases and substantially constant phase current so that the motor torque is constant over the broad range of speed.

Figure 1:
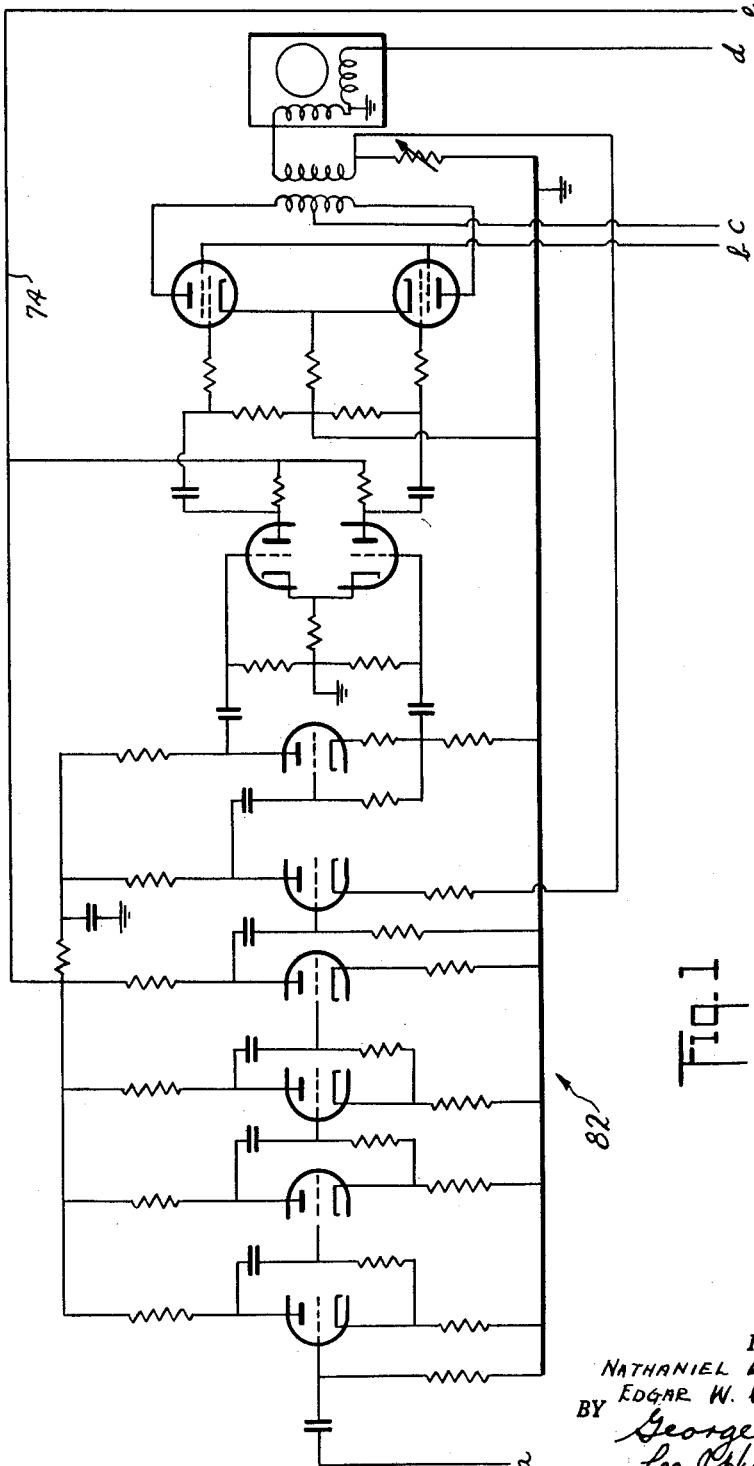
Figure 2:
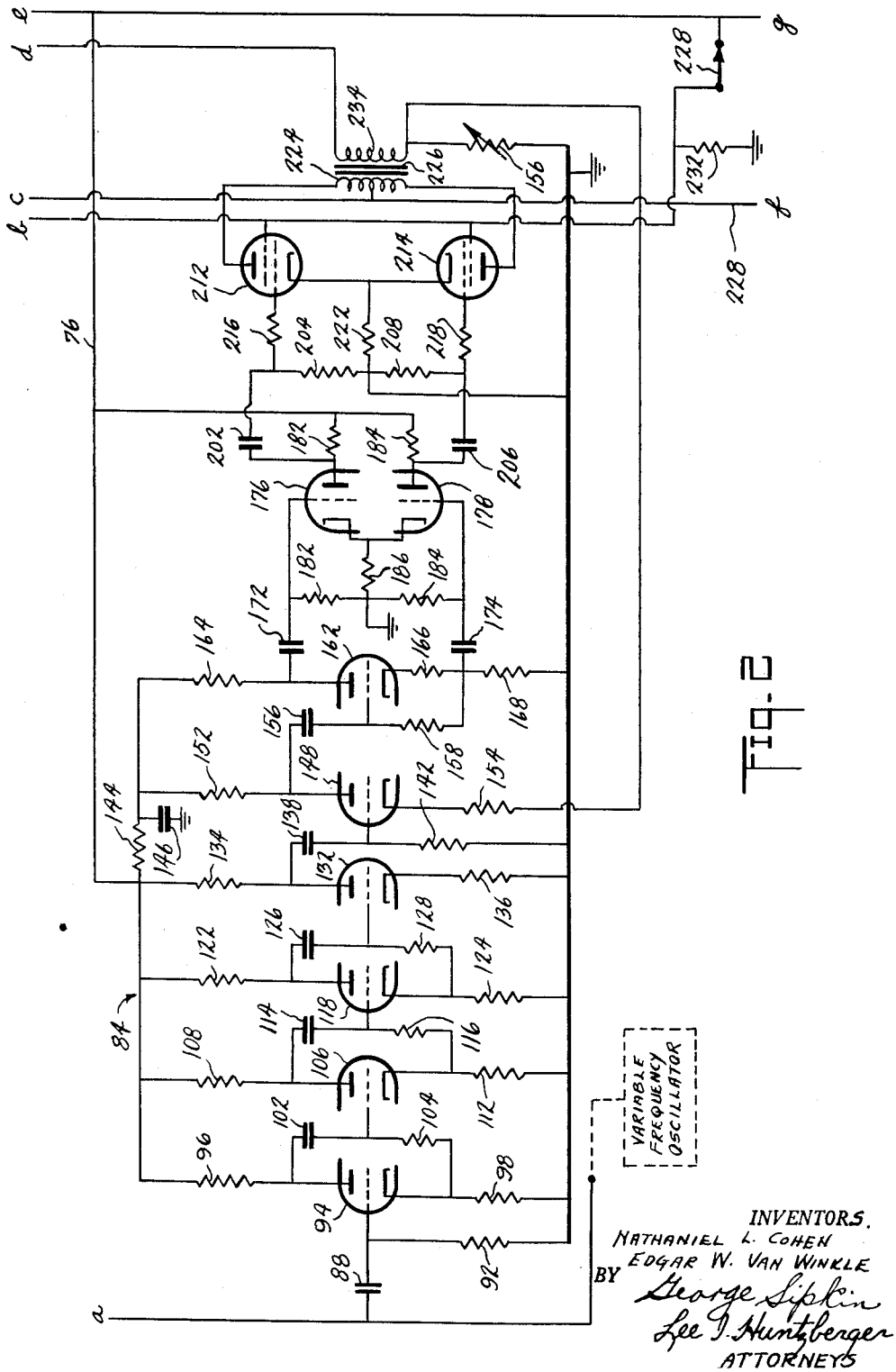
Figure 3:
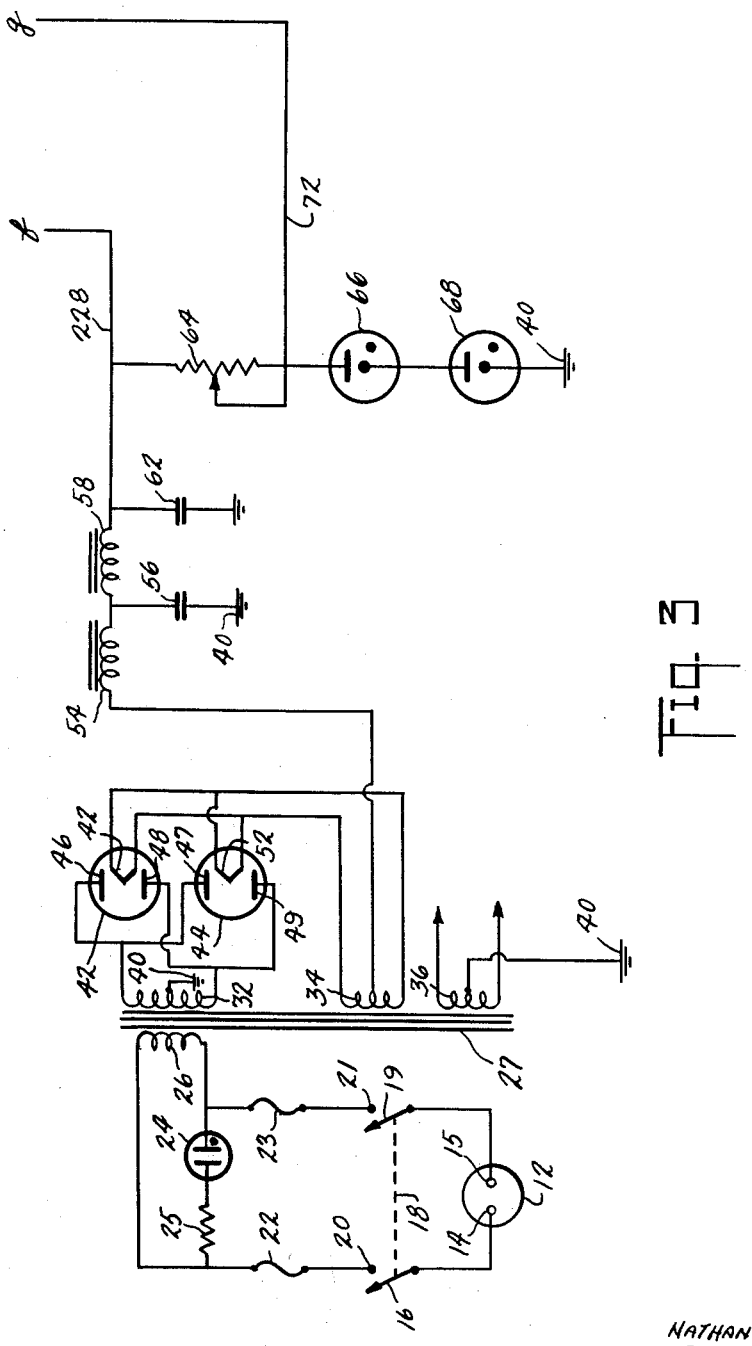
Figure 4:
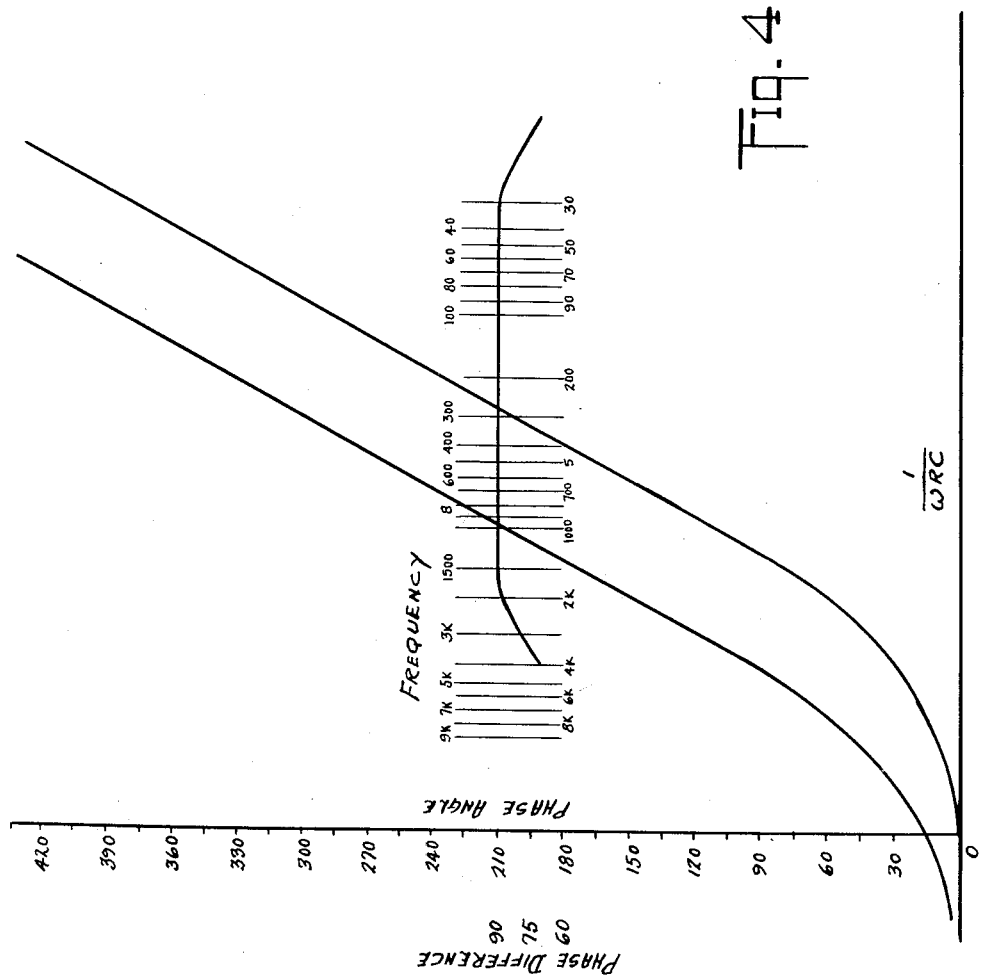

Other objects and many of the attendant advantages of this invention will be readily appreciated as the same becomes better understood by reference to the following detailed description when considered in connection with the accompanying drawings wherein:

Figs. 1–3 comprise a composite schematic wiring diagram of a preferred embodiment of this invention, and Fig. 4 is a graph showing the relationship of phase angle and phase difference versus frequency.

A house-current supply is adapted to be connected to the receptacle 12. Receptacle 12 includes a pair of terminals 14 and 15. The terminals 14 and 15 are connected to the poles 16 and 17, respectively, of the switch 18. The fixed contacts of the switch are shown at 20 and 21. In series with the fixed contacts 20 and 21 of the switch 18 are a pair of line fuses 22 and 23. Connected across the fused input line is a neon indicator bulb 24 in series with a current limiting resistor 25. Also connected across the fused input lines is the primary 26 of a transformer 27. The transformer 27 includes three secondary windings, 32, 34 and 36. The secondary winding 36 is centertapped and connected to a source of reference potential, hereinafter referred to as ground and conventionally indicated by the symbol shown at 40. The secondary winding 36 is adapted to be connected in circuit with all the heater filaments of the tubes included in the disclosed circuit, which heater filaments are not shown on the drawing; the only filaments which are not supplied by the secondary winding 36 are the filament cathode of both full-wave rectifiers 42 and 44 (e.g. 5R4). The full-wave rectifiers 42 and 44 are connected in parallel in order to increase the power capacity of the circuit. The secondary winding 32 is centertapped and connected to ground 40. One end of the secondary winding 32 is connected to the plates 46 and 47 while the other end of the secondary winding 32 is connected to the plate 48 and the plate 49 of the full-wave rectifiers 42 and 44. The opposite ends of the secondary winding 34 is connected to corresponding ends of the filament cathodes 52 and 53 to supply the heating power therefor. The output of full-wave rectifiers derived at the centertap of the secondary winding 34 is filtered by means of a pair of cascaded LC filter stages including input choke 54, condenser 56, choke 58 and output condenser 62. The output of the cascaded filter sections is substantially devoid of ripple voltage through the use of high value components in the filter. To provide a constant direct current output there is connected between the output of the filter and ground 40, in series, a potentiometer 64 and a pair of identical voltage-regulator tubes 66 and 68 (e.g. OA2). The potentiometer 64 serves to adjust the current level in the regulator tubes. The lead 72, one end of which is connected to the plate end of the voltage-regulator tube 66, constitutes the plate supply voltage lead for all the included triode stages except the power output stages of the circuit. The lead 72 divides into two branches, 74 and 76. The circuit proper, exclusive of the power input portion described above, comprises two phase-shifting power amplifying networks 82 and 84. The networks 82 and 84 are similar differing in the value of their resistor-capacitor combinations, providing for different degrees of phase shift. The two sections 82 and 84 receive the same sinusoidal input voltage and are adapted to provide amplified power outputs at a frequency identical with the input frequency but differing 90° in phase. This phase difference remains substantially constant over a considerable frequency range; a model constructed according to this invention provided a constant phase difference between 60 and 600 cycles. Since the networks 82 and 84 of the circuit are substantially identical, only the section 84 will be described.

The alternating voltage output from a variable frequency source, 83, shown in phantom, is coupled into the network 84 by means of a lead 86. The network 84 includes an input condenser 88 and a grid-leak resistor 92. Since the circuit is to operate over a wide frequency range, it is important that there be no frequency distortion in the circuit. The input components including the condenser 88 and the grid resistor 92 are designed so that their time constant compares favorably with the period of the lowest frequency to be processed by the circuit for application to a power consuming device such as a two-phase motor. In addition to considering the time constant, the impedance of the resistor 92 at the lowest frequency is to be several times as large as the impedance of the condenser 88 at that frequency so that the attenuation of the input voltage to the first stage of the circuit is not excessive.

The first stage of network 84 includes a triode 94 (e.g. ½ 12AU7) connected in series with a plate load resistor 96 and a cathode bias resistor 98. The resistors 96 and 98 are identical. Therefore, any voltage developed across the resistor 96 is equal to the voltage developed across the resistor 98. Connected across the triode section 94 is a phase shift combination including the condenser 102 and the resistor 104. Since change in potential at the plate of the triode 94 is 180° out of phase with the corresponding potential change at the cathode of the triode 94, any connection made between the plate and the cathode such as the combination including the condenser 102 and the resistor 104 is subject to twice the potential change that would be encountered if the resistor 104 were to terminate at ground. Because of the feed-back voltage developed across the cathode-bias resistor 98, the frequency distortion introduced by the triode section 94 is substantially reduced. This is an important feature of this invention.

To determine the magnitude of the capacitor 102 and the resistor 104 use is made of the equation $$\theta = 2 \tan^{-1} \frac{1}{\omega RC}$$

where $\theta$ is the phase angle between input voltage and output voltage, R is the magnitude of the resistance in ohms, C is the magnitude of the capacitance in farads and $\omega$ is the frequency in radians per second. This equation is obtained from volume 19 of the Massachusetts Institute of Technology Radiation Laboratories Series on Wave Forms published by McGraw-Hill Book Company; particular reference is made to pages 137 and 138 of the book. In determining the magnitudes of the components and the number of stages in the network, it is taken into account that the angle phase shift introduced by each of the cascaded stages of the network are added in order to obtain a linear phase shift over the desired frequency range.

The instantaneous voltage developed across the resistor 104 plus that developed across the cathode resistor is direct coupled into the control grid of the triode section 106 (e.g. ½12AU7). The triode section 106 is connected in series with the plate load resistor 108 and a cathode bias resistor 112. Resistors 108 and 112 are identical to one another and to the resistors 96 and 98 of the preceding stage. Connected across the triode section 106 is a condenser 114 in series with a resistor 116. The magnitude of the condenser 114 is 10 times that of the condenser 102. A third stage follows differing only from the second stage in that the condenser is again 10 times as large as the condenser in the preceding stage. More particularly, this third stage includes triode section 118 (e.g. ½12AU7) connected in series with the plate load resistor 122 and the cathode bias resistor 124. Connected across the triode section is a condenser 126 connected in series with a resistor 128. The voltage developed at the junction between condenser 126 and resistor 128 is direct coupled into the grid of the triode amplifier section 132. Because of the large amount of feed-back voltage developed across the cathode bias resistors 98, 112, and 124, substantially no amplification takes place in these stages but the frequency response characteristic of the combined stages over the operating frequency range is substantially independent of frequency. Furthermore, harmonic distortion introduced by the tubes is eliminated. Since the condenser of the phase shift network of each succeeding stage, of the three stages described is made larger by a factor of 10, the stage shift in each succeeding stage is less. Furthermore, while the angle of phase shift decreases, the amplitude of the voltage applied to each succeeding stage increases since the ratio of impedance of the resistor to the condenser in each phase shift combination increases with each reduction by a factor of 10 in the impedance of the associated condenser in the RC phase shift combination in each of the stages.

The triode amplifier 132 succeeding the phase-shifting sections of the network 84 is connected in series with a plate load resistor 134 and a cathode bias resistor 136. The magnitude of the cathode bias resistor 136 is only a small fraction of the magnitude of the plate load resistor 134 in contradistinction to the preceding phase shift stages. The amplified output of the triode amplifier derived at the plate of the triode 132 is coupled into a succeeding amplifier stage through a coupling condenser 138 and a grid-leak resistor 142. The condenser 138 and the resistor 142 are substantially identical to the input condenser 88 and resistor 92, respectively.

The phase shift stages and the succeeding amplifying stages are decoupled by means of a resistor 144 and a condenser 146. The succeeding amplifier stage includes the triode section 148 (e.g. ½12AU7) connected in series with a plate load resistor 152 and a cathode bias resistance means including a fixed resistor 154 and a variable resistor 156 arranged at the output for negative feedback. The latter has about five percent of the resistance value of the resistor 154. The amplifier stage including the triode 148 provides an output voltage that is coupled by means of a condenser 156 and a resistor 158 into a phase-splitter including a triode section 162 (e.g. ½12AU7), a plate load resistor 164 and cathode bias resistors 166 and 168. The resistor 164 and the resistor 168 are identical so that any change in current flow through the triode 164 is accompanied by identical voltage changes across resistors 164 and 168 differing only in that they are 180° out of phase. To reduce the bias on the grid of the triode 162, the grid-leak resistor 158 is connected to the junction between the cathode bias resistors 166 and 168. The two outputs of the phase splitter which are 180° out of phase, are coupled into a push-pull amplifier through coupling condensers 172 and 174. Push-pull amplifier includes triode stages 176 and 178 (e.g. 12AU7). The grids of the triodes 176 and 178 are connected to grid-leak resistors 182 and 184, respectively, across which the signal voltages are developed. The cathodes of the two triodes 176 and 178 are mutually connected, both being connected to ground through a cathode bias resistor 186. Identical plate load resistors 192 and 194 are provided for the triode sections 176 and 178, respectively. The output voltages of the triode sections 176 and 178 are coupled through coupling condensers 202 and 206 and are combined across the series connected resistors 204 and 208.

The junction between the resistors 204 and 208 is connected directly to ground. The time constant of the resistor-capacitor coupling circuits between the push-pull voltage amplifier and the push-pull power amplifier is substantially identical to that of the input resistor-capacitor coupling circuit including condenser 88 and resistor 92. However, the total impedance of each of the resistor-capacitor coupling circuits between the push-pull stages and the ratio of impedance of resistor to condenser is increased.

The output push-pull amplifier includes a pair of high-power tetrodes 212 and 214 (e.g. 807). Connected in circuit with the control grid of each of the tetrodes 212 and 214 are grid current limiting resistors 216 and 218, respectively. The cathodes of both are connected together and through a cathode bias resistor 222 to ground. The plates are connected to opposite ends of the primary 224 of an output transformer 226. The plate supply voltage for the push-pull amplifier is derived at the output condenser 62 of the filter and is applied to the centertap of the primary 224 of the output transformer 226 by means of a connecting lead 228. The screen grids of both the power output tubes 212 and 214 are connected together and to the lead 72 which, in turn, is connected to the plate end of the voltage regulator tube 66. Connected between the lead 72 and ground is a switch 228 and a relatively high value resistor 232. When the switch 232 is closed, the screen grids are at the potential developed across the voltage regulator tubes 66 and 68 and when the entire circuit is shut down the resistor 232 serves to discharge the filter resistors. When the switch is open, the screen grids are all grounded. When the power supply of this invention is used to drive a two-phase motor, the above condition is useful at starting. The plate supply voltage for the output tetrodes is derived at the output condenser 62 of the filter thereby putting the plate of the tetrodes at the somewhat higher potential required for proper operation. Slight ripple voltage in the plate supply of the tetrodes has no effect on the output.

The output of the push-pull amplifier is derived across the transformer secondary 234. The output transformers are designed to match the power supply to the load (i.e. a two-phase motor) which it is adapted to power.

The operation of the network 82 is identical to that of the network 84 above described, except that the output voltage developed is 90° out of phase over the working range of frequencies. Therefore, if the outputs of both networks 82 and 84 are applied to the separate phases of a two-phase motor to power the latter, it is possible to control the speed of such two-phase motor over a wide range without any decrease in torque. By arranging feedback rheostats 156 in the outputs of each of the networks of the circuit where the rheostats are arranged for negative feedback, each phase maintains substantially constant output current over the frequency range involved.

For further information relative to the operation of the circuit, reference is made to "Wide-Angle Phase Shift Networks" in the Electronics Magazine, volume 19, December 1946, pages 112–115. Also pertinent is an article entitled "Properties of Some Wide-Band Phase-Splitting Networks" found in proceedings of the IRE, volume 37, No. 2, February 1949, on pages 147–151.

Obviously many modifications and variations of the present invention are possible in the light of the above teachings. It is therefore to be understood that within the scope of the appended claims the invention may be practiced otherwise than as specifically described.

We claim:

1. A variable speed, constant torque driving means comprising a two-phase motor for operation over a broad speed range; a selectively controllable variable frequency source; a pair of phase-shifting networks connected to said selectively controllable variable frequency source whereby the voltage input to each of said phase-shifting networks from said selectively controllable frequency source is in phase and of identical amplitude at every instant; each of said phase-shifting networks including a source of plate supply voltage, a plurality of cascaded phase-shift stages, each of said phase-shift stages including a vacuum tube with at least a control electrode, a plate, and cathode, connected to identical plate load and cathode-bias resistors, each of said phase-shift stages further including a resistor and condenser connected in series between the plate and cathode, respectively, of said vacuum tube, whereby the output voltage of each phase shift stage is derived at the junction of its series-connected condenser and resistor, whereby there is obtainable from said pair of phase-shifting networks a two-phase output with a substantially 90 degree phase difference between the phases over a broad frequency range; voltage amplifier means connected to the output of each of said phase-shifting networks, respectively; power amplifier means connected to the output of each of said voltage amplifier means, respectively; the phases of said two-phase motor connected to the respective outputs of said power amplifier means; and current feedback means connected between the output of each power amplifier means and the input of its respective voltage amplifier means to keep output current constant; whereby the current inputs to the two phases of said two phase motor are substantially 90 degrees apart and substantially constant in amplitude over a broad frequency range, whereby the motor torque is substantially constant over a broad speed range.

2. An alternating current power supply for a plural phase motor to cause the latter to operate over a broad range of speed at substantially constant torque in response to frequency change only, said power supply comprising, a selectively controllable variable frequency source; one channel for each phase of said plural phase motor, each channel including a phase-shifting network connected at its input to the output of said selectively controllable variable frequency source, said phase-shifting network including a source of plate supply voltage, a plurality of cascaded phase-shift stages, each of said phase-shift stages including a vacuum tube with at least a control electrode, a plate, and cathode, connected to identical plate and cathode resistors, each of said phase shift stages further including a resistor and condenser connected in series between the plate and cathode, respectively, of said vacuum tube, whereby the ouput voltage of each phase shift stage is derived at the junction of its series connected condenser and resistor, whereby there is obtainable from the phase-shifting networks of said channels a plural phase output with a substantially constant phase difference between the phases over a broad frequency range, each channel further including voltage amplifier means connected to the output of the respective phase-shifting network, power amplifier means connected to the output of the respective voltage amplifier means, and current feedback means connected between the output of said power amplifier means and the input of its respective voltage amplifier means to keep output current constant, whereby when the plural phase motor is connected to said power supply, said motor is operable over a broad range of speed with substantially constant output torque in response to adjustment of said variable frequency source only, due to substantially constant phase angle between the phase currents and substantially constant phase currents over the broad frequency range.

References Cited in the file of this patent

UNITED STATES PATENTS

| | | |
|---|---|---|
| 2,340,875 | Gibbs | Feb. 8, 1944 |
| 2,341,232 | Norton | Feb. 8, 1944 |
| 2,392,476 | Hodgson | Jan. 8, 1946 |
| 2,454,426 | Beckwith | Nov. 23, 1948 |
| 2,570,651 | Demuth | Oct. 9, 1951 |
| 2,576,499 | Bowes | Nov. 27, 1951 |
| 2,585,573 | Moore | Feb. 12, 1952 |
| 2,623,203 | DeMuth | Dec. 23, 1952 |
| 2,648,773 | Wallace | Aug. 11, 1953 |
| 2,668,238 | Frink | Feb. 2, 1954 |

OTHER REFERENCES

"Wideband Phase Shift Networks," by Dome: Electronics, vol. 19, December 1946, pp. 112–115.